C. H. CAMPBELL.
DESICCATING MILK.
APPLICATION FILED OCT. 2, 1907.
996,832.
Patented July 4, 1911.
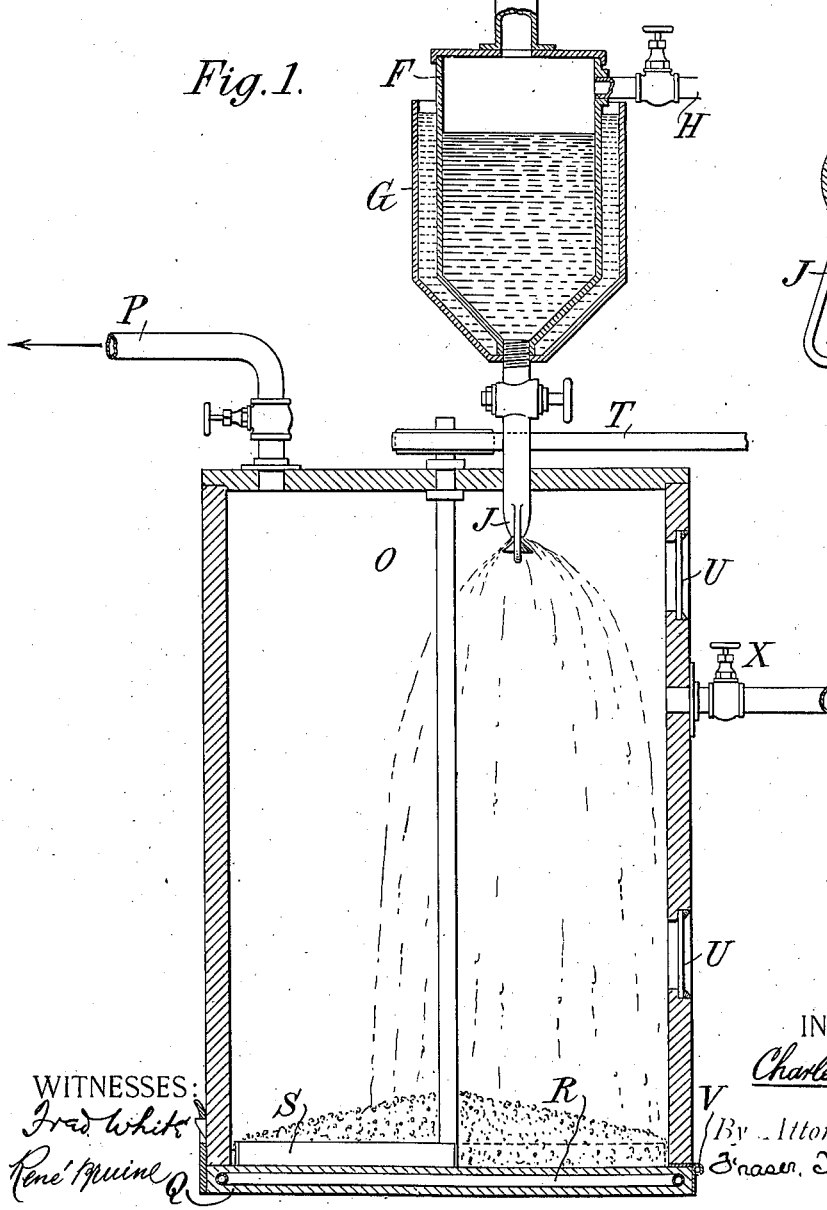
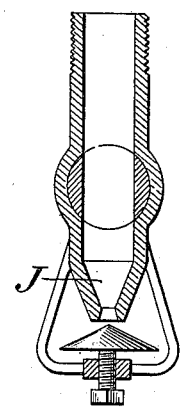
Fig. 2.
WITNESSES:
Fred White
René Bruine
INVENTOR:
Charles H. Campbell,
By Attorneys,
Fraser, Dink & Myers

UNITED STATES PATENT OFFICE.

CHARLES H. CAMPBELL, OF NEW YORK, N. Y.

DESICCATING MILK.

996,832.  Specification of Letters Patent.  Patented July 4, 1911.

Application filed October 2, 1907. Serial No. 395,555.

*To all whom it may concern:*

Be it known that I, CHARLES H. CAMPBELL, a citizen of the United States, residing in the borough of Manhattan, city, county, and State of New York, have invented certain new and useful Improvements in Desiccating Milk, of which the following is a specification.

This invention aims to provide an improved method of reducing to powdered form milk or similar liquids.

An important feature of the invention is the spraying of the heated or warmed milk, preferably after a preliminary concentration, into a cooler atmosphere, whereby it is suddenly cooled, and the water of the fine globules is evaporated and whereby also a thin skin is formed upon each of the globules, which eliminates, or substantially diminishes, the tendency of the globules to coalesce as they fall upon the receptacle. The receptacle, which may be a tray or a belt, is then shifted into an oven where the last remaining particles of moisture in the globules may be extracted. For example, they may be converted in the oven to a practically bone-dry condition containing about 3 per cent. of water.

The process is preferably applied to the desiccation of skimmed milk. Roughly speaking, such milk contains 10 per cent. of solids and 90 per cent. of water. The first concentration may be continued until the milk is reduced to approximately one-sixth of its original volume. It will then contain 10 parts of solids to 6 parts of water and will be quite thick. This degree of concentration may be departed from more or less, the first concentration being carried preferably as far as possible, but not to such a point as to make the milk too thick to form a finely divided spray. In the first concentration in bulk and also in the final drying out of the globules or granular mass, the temperature should preferably be kept below the coagulating point of albumen (140° to 162° F.). The concentrated milk is sprayed into a vacuum chamber so as to increase the quickness of evaporation, and the final drying may be effected either in the vacuum chamber or after removal of the milk therefrom. By reason of the use of a vacuum chamber it will not be necessary for the spray to fall through such a distance as would be required if the milk were sprayed into a medium at atmospheric pressure, because of the increased rapidity of evaporation in the vacuum chamber. The process is a cooling one, the heat being applied to the milk beforehand and being extracted from the milk in the evaporation by spraying.

Various mechanisms may be used for carrying out the process.

The accompanying drawings illustrate diagrammatically such an apparatus.

Figure 1 is a vertical sectional view of an apparatus for carrying out the process embodying the invention. Fig. 2 is a sectional view of the spraying valve.

Referring now to the drawings the preliminary concentration may be effected in a tank A which may be, for example, of the type shown in the patent of J. H. Campbell, No. 668,161. In this tank air is injected through nozzles B, while the mass is heated by hot water circulation in the jacket C and through the coils D. After the mass in the tank A has been concentrated to the desired extent it is run off by opening a hand valve E into a closed reservoir F which is preferably also heated by a water jacket G, and which has connected to it a pipe H for admitting air pressure to force the milk out of a spraying nozzle J at the lower end of the tank. The reservoir F may be omitted where it is convenient to effect the spraying immediately after the concentration in the tank A and while the milk is still heated, (generally with a temperature of about 140°) but it will be found more convenient generally to use an intermediate storage reservoir F. A suitable spraying nozzle is shown in sectional view in Fig. 2.

The drawing shows the vacuum chamber O into which the warmed milk is led from the storage tank F or preliminary tank, the exhaustion of air being effected through a pipe P leading to a vacuum pump. The spray falls in a comparatively dry condition upon the bottom Q of the chamber which may be provided with hot water circulating pipes R so as to effect the final drying in the vacuum chamber instead of in a separate oven. Preferably a sweep S is provided for continuously stirring the mass upon the bottom of the vacuum chamber, the sweep being arranged on a shaft which is supported in the upper wall of the chamber and which is rotated by a pulley and a belt T. Windows U are provided for observing the condition of the product and of the spray. The bottom Q is preferably hinged at one edge by means of a hinge V and held up by a latch W. When a sufficient batch of the product has been made, the pipe leading to the vacuum chamber is closed and the bottom of the chamber is unlatched and dropped so as to let the product fall into hoppers or receptacles. A valve X may be opened to break the vacuum.

A great advantage of the process of this invention lies in the elimination of the necessity for maintaining a current of hot dried air passing over the spray, as has been necessary where the heat of the original concentration of the milk, or heat applied to the milk for that particular purpose, has not been made available. With this invention the spray passes through a substantially still medium and the collection of the product is thereby very much facilitated; the danger of burning the product, which is very susceptible to heat in this finely divided condition, being also avoided.

An important advantage of the process is in the obtaining of a product which is in a spongy condition so as to readily take up water and be readily divisible in water when the product is to be remade into liquid milk. That is to say, the particles remain as nearly as possible in the same condition as in normal milk. The action of the heat when the milk is sprayed is to vaporize the water in each globule so as to cause each separate globule to be of spongy consistency. The effect is especially marked because the spraying takes place in a vacuum where the vapor is quickly formed and dissipated.

What I claim is:—

The process of desiccating milk which consists in concentrating and heating it, the heating being carried to a temperature below the coagulating point of albumen and the concentrating being carried as far as possible consistent with the subsequent reduction of the milk to a fine spray, finely spraying the concentrated heated milk into a vacuum at a lower temperature whereby the heat therein is dissipated and a quick evaporation is effected, and whereby the tendency of the fine globules or grains to coalesce is substantially diminished, and whereby it is reduced to a spongy condition, and heating the mass after it is collected to dry out the remaining moisture.

In witness whereof, I have hereunto signed my name in the presence of two subscribing witnesses.

CHARLES H. CAMPBELL.

Witnesses:
 DOMINGO H. USINA,
 FRED WHITE.